US009478251B2

(12) United States Patent
Chaudhri et al.

(10) Patent No.: US 9,478,251 B2
(45) Date of Patent: Oct. 25, 2016

(54) GRAPHICAL USER INTERFACES FOR DISPLAYING MEDIA ITEMS

(75) Inventors: Imran A. Chaudhri, San Francisco, CA (US); Thomas Matthieu Alsina, Mountain View, CA (US); Lucas Newman, San Francisco, CA (US)

(73) Assignee: Apple Inc., Cupertino, CA (US)

(*) Notice: Subject to any disclaimer, the term of this patent is extended or adjusted under 35 U.S.C. 154(b) by 183 days.

(21) Appl. No.: 13/244,064

(22) Filed: Sep. 23, 2011

(65) Prior Publication Data

US 2012/0311500 A1   Dec. 6, 2012

Related U.S. Application Data

(60) Provisional application No. 61/493,393, filed on Jun. 3, 2011.

(51) Int. Cl.
*G06F 3/048* (2013.01)
*G11B 27/00* (2006.01)

(52) U.S. Cl.
CPC ..................................... *G11B 27/00* (2013.01)

(58) Field of Classification Search
CPC ............. H04N 5/44543; H04N 21/84; H04N 21/4312; H04N 67/02
USPC ................. 715/835, 727, 793, 796, 810, 864
See application file for complete search history.

(56) References Cited

U.S. PATENT DOCUMENTS

| | | | |
|---|---|---|---|
| 7,739,723 B2 | 6/2010 | Rogers et al. | |
| 7,992,104 B2 * | 8/2011 | Weir et al. | 715/838 |
| 8,762,885 B2 * | 6/2014 | Hwang et al. | 715/835 |
| 2002/0054158 A1 | 5/2002 | Asami | |
| 2008/0066016 A1 | 3/2008 | Dowdy et al. | |
| 2008/0155470 A1 * | 6/2008 | Khedouri et al. | 715/810 |
| 2009/0064057 A1 * | 3/2009 | Bull et al. | 715/864 |
| 2009/0089676 A1 | 4/2009 | Finkelstein et al. | |
| 2009/0177758 A1 * | 7/2009 | Banger et al. | 709/219 |
| 2009/0183076 A1 | 7/2009 | Shim et al. | |
| 2009/0254861 A1 * | 10/2009 | Seetharamakrishnan et al. | 715/810 |
| 2009/0307633 A1 | 12/2009 | Haughay, Jr. et al. | |
| 2010/0106730 A1 * | 4/2010 | Aminian et al. | 707/748 |
| 2010/0306657 A1 | 12/2010 | Derbyshire et al. | |
| 2011/0126155 A1 * | 5/2011 | Krishnaraj et al. | 715/811 |
| 2011/0138331 A1 * | 6/2011 | Pugsley et al. | 715/835 |
| 2012/0158531 A1 * | 6/2012 | Dion | G06Q 10/10 705/26.1 |

OTHER PUBLICATIONS

International Search Report and Written Opinion of the International Searching Authority, PCT Application Serial No. PCT/US2012/037965, Oct. 2, 2012, 11 pp.

* cited by examiner

*Primary Examiner* — Anil N Kumar
(74) *Attorney, Agent, or Firm* — Fish & Richardson P.C.

(57) ABSTRACT

Graphical User Interfaces (GUIs) for a digital media player application are disclosed. In one aspect, a GUI is generated that presents a "histogram view" of digital media items of a digital media source. The histogram view associates visual representations of the digital media items with a media attribute, such as associating songs with a recording artist who recorded the songs. In another aspect, a GUI is generated that presents a "stack view" including stacks of visual representations of digital media items that are associated with a media attribute, such as a playlist or artist. The stacks of visual representations can be scrubbed by a user (e.g., using a touch gesture) to select digital media items in the stack for playback.

18 Claims, 7 Drawing Sheets

GRAPHICAL USER INTERFACES FOR DISPLAYING MEDIA ITEMS

CROSS-REFERENCE TO RELATED APPLICATIONS

This application claims priority to pending U.S. Provisional Application Ser. No. 61/493,393, entitled "Graphical User Interfaces for Displaying Media Items", filed on Jun. 3, 2011, the entire contents of which are incorporated herein by reference.

TECHNICAL FIELD

This disclosure relates generally to graphical user interfaces (GUIs) for media applications.

BACKGROUND

Modern digital media player applications provide GUIs for browsing, selecting, accessing and playing digital media items, such as songs, videos, audiobooks and e-books. If the digital media player application is running on a mobile device with a limited screen size (e.g., a smartphone, electronic tablet), a poorly designed GUI can appear cluttered and disorganized, and thus difficult to navigate by a user.

SUMMARY

GUIs for a digital media player application are disclosed. In one aspect, a GUI is generated that presents a "histogram view" of digital media items available from a digital media source. The histogram view associates visual representations of the digital media items with a media attribute, such as associating songs with a recording artist who recorded the songs. In another aspect, a GUI is generated that presents a "stack view" including stacks of visual representations of digital media items that are associated with a media attribute, such as a playlist or artist. The stacks of visual representations can be scrubbed by a user (e.g., using a touch gesture) to select digital media items in the stack for playback.

In some implementations, a method comprises: receiving first input requesting a view of digital media items available from a digital media source; and generating the requested view, the view including a number of visually delineated regions, each delineated region associated with a media attribute, each region including a visual representation for a media item associated with the media attribute that is available from the digital media source.

In some implementations, a method comprises: receiving first input requesting a view of digital media items available from a digital media source; generating the requested view, the view including a number of stacks of visual representations of the digital media items; and receiving second input directed to a stack, the second input causing a first visual representation at the top of the stack to be replaced with a second visual representation in the stack according to a stack order.

Other implementations include systems and computer-readable mediums. Particular implementations of GUIs for displaying digital media items, provides one or more of the following advantages. Histogram and stack views of digital media items enable a user to determine quickly the number and types of digital media items associated with a media attribute that are available for playback from a digital media source.

The details of one or more disclosed implementations are set forth in the accompanying drawings and the description below. Other features, aspects, and advantages will become apparent from the description, the drawings and the claims.

BRIEF DESCRIPTION OF THE DRAWINGS

Like reference symbols in the various drawings indicate like elements.

DETAILED DESCRIPTION

Exemplary Histogram View of Digital Media Items

Figure 1:
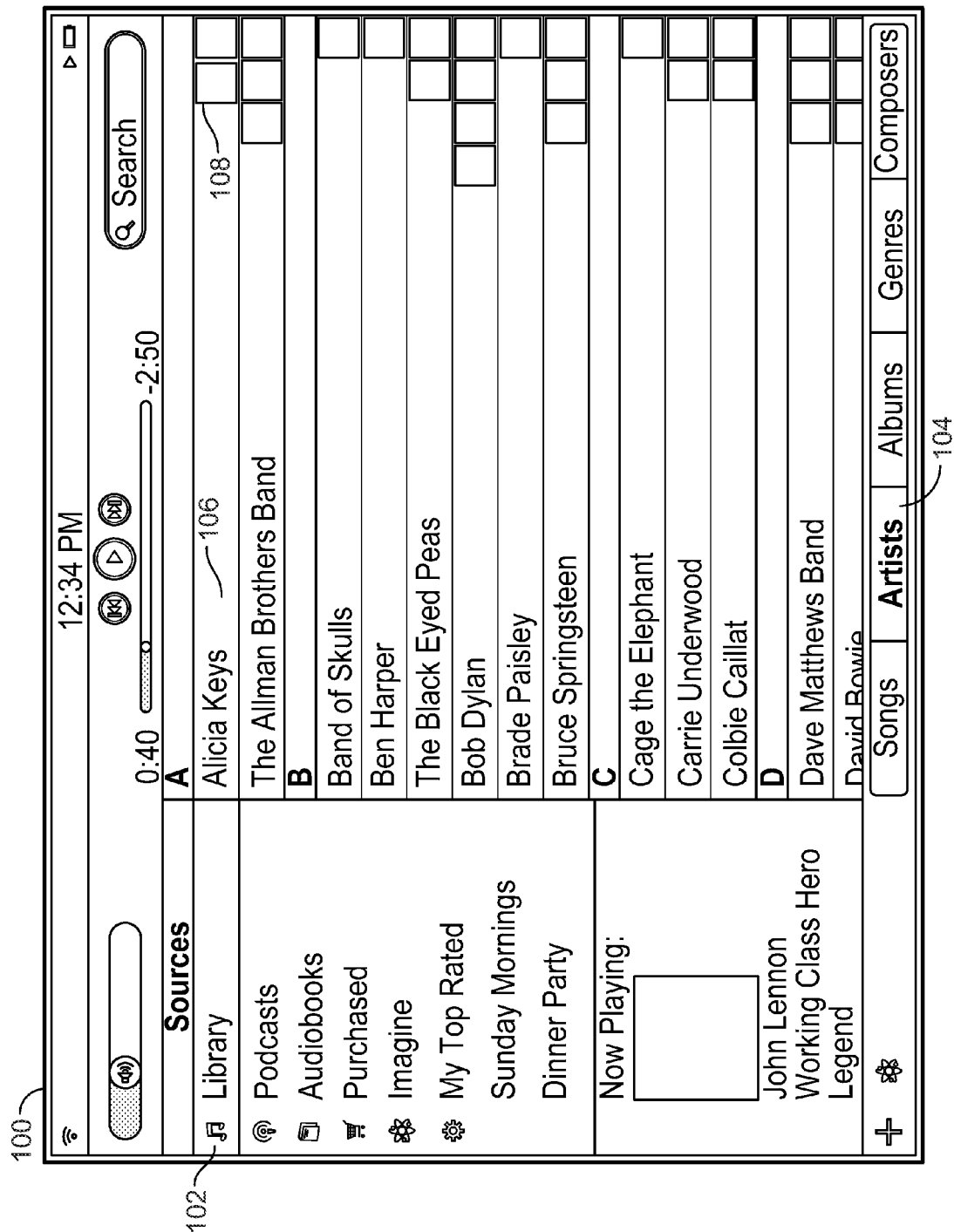
FIG. 1 is an exemplary GUI for viewing digital media items in a histogram view.

FIG. 1 is an exemplary GUI 100 for viewing digital media items in a histogram view. In some implementations, GUI 100 is displayed on display of a computer, smartphone, electronic tablet, television system or any other electronic device that is capable of displaying GUI 100. GUI 100 can be generated by a media player application residing on a mobile device (e.g., e-tablet), and provides a user with histogram views of a digital media items. Generally, digital media items can include songs, videos, audiobooks or any other digital content. In the example shown, the digital media items are songs or albums of songs.

In some implementations, a user can select media source 102 from a list of media sources. In the example shown, the user has selected a digital media library as the media source 102. Media source 102 can be physically stored on the device or on a network, or at least partially stored on both a device and a network.

In GUI 100, there are five user selectable media attributes: Songs, Artists, Albums, Genres and Composers. The user has selected an "Artist" view of media items by clicking or touching the "Artist" user interface element 104. In some implementations, the Artist view can include a number of visually delineated regions 106. Each of regions 106 can be associated with a media attribute (e.g., Artist, Composer), and can include a visual representation 108 for each media item associated with the media attribute that is stored in media source 102. The view shown in FIG. 1 is referred to as a histogram view due to the arrangement of visual representations 108 in regions 106 which (when rotated clockwise by 90 degrees) looks like a histogram. The histogram view provides advantages over other media item views by visually indicating the number of media items associated with a media attribute that are available in media source 102.

In some implementations, each of regions 106 can be a separate row in a scrollable list of media attribute descriptions, such as artist names, which can be displayed in the list in alphabetical order. For example, the artist names Alicia Keys and The Allman Brothers Band can be listed in an "A" section of the artist list and the artist names Band of Skulls and Ben Harper can be listed in a "B" second of the artist list.

In some implementations, the visual representations 108 can be icons depicting artwork associated with the digital media items, such as album cover art. At least one of the visual representations 108 can be user-selectable. For example, when a user clicks or touches an icon the digital media item corresponding to the icon can be immediately played back by a digital media player. The digital media item can be played back on the digital media player from a file stored on the device or streamed to the digital media player from an online media service.

Although the Artist media attribute is shown as a histogram view in FIG. 1, the histogram view can also be used for other media attributes. For example, a Composer media attribute can use the histogram view to indicate the number of albums or songs associated with a particular composer that are available in media source 102. Similarly, a Genres media attribute can use the histogram view to indicate the number of albums or songs per music genre (e.g., rock, jazz, classical) that are available in media source 102.

Exemplary Stack View of Digital Media Items

Figure 2A:
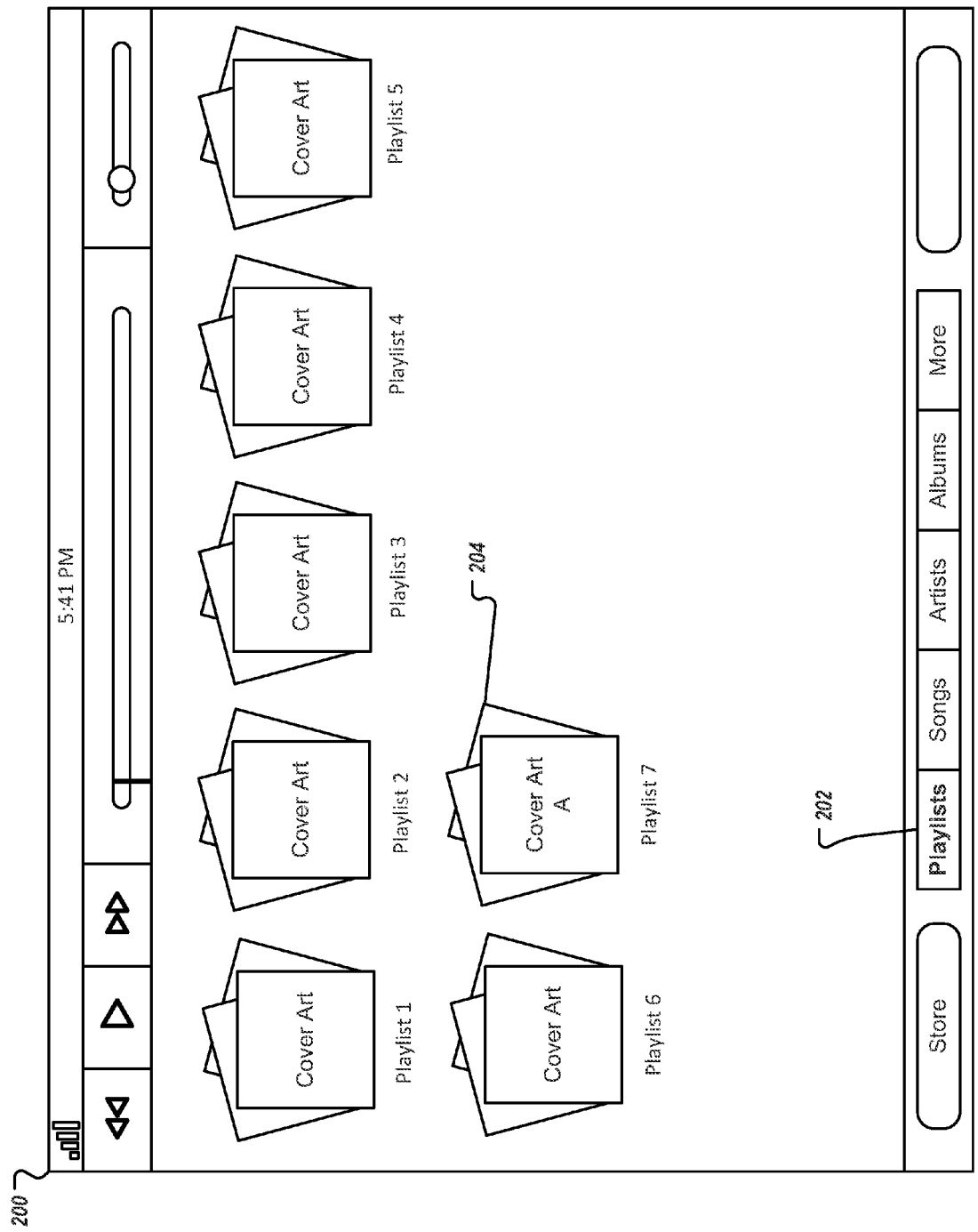
FIG. 2A is another exemplary GUI for viewing digital media items in a stack view.

FIG. 2A is another exemplary GUI 200 for viewing digital media items in a stack view. In some implementations, GUI 200 is displayed on display device of a computer, smartphone, electronic tablet, television system or any other electronic device that is capable of displaying GUI 200. In the example shown, GUI 200 is generated by a digital media player application residing on a mobile device, and provides a user with stacks of visual representations of digital media items associated with media attributes. In the example shown, there are four user selectable media attributes: Playlists, Songs, Artists and Albums. A fifth user interface element entitled "More" provides a menu of additional user-selectable media attributes (e.g., Genres, Composers).

In some implementations, a user can select user interface element 202 to display a stack view of visual representations of digital media items associated with a playlist. A playlist can be a user-generated or program-generated list of digital media items that can be managed as a group. The playlist stack view can include a number of stacks 204 of visual representations of digital media items, where each stack represents a playlist or some other user-selected media attribute (e.g., artist, composer). The visual representations in each stack 204 can be misaligned (as shown in FIG. 2A) to provide a user with a visual indication of the number of digital media items in the playlist and to provide the look and feel of a stack of items (e.g., a stack of album covers). The stacks 204 can be arranged in GUI 200 in numerical order as shown in FIG. 2A.

In some implementations, the visual representations in each stack 204 can be icons depicting artwork associated with a digital media item in the playlist, such as album cover art. The visual representation at the top of stack 204 can be user-selectable. For example, when a user clicks or touches the visual representation, the digital media item corresponding to the icon can be immediately played back by a digital media player. The digital media item can be played back on the digital media player from a file stored on the device or streamed to the digital media player from an online media service.

A stack view can also be used for displaying digital media items associated with other media attributes, such as a particular artist or composer. In this case, each stack 204 contains visual representations associated with songs or albums of the artist or composer. Other stack views are also possible, such as displaying stack 204 for each genre of music or video.

Figure 2B:
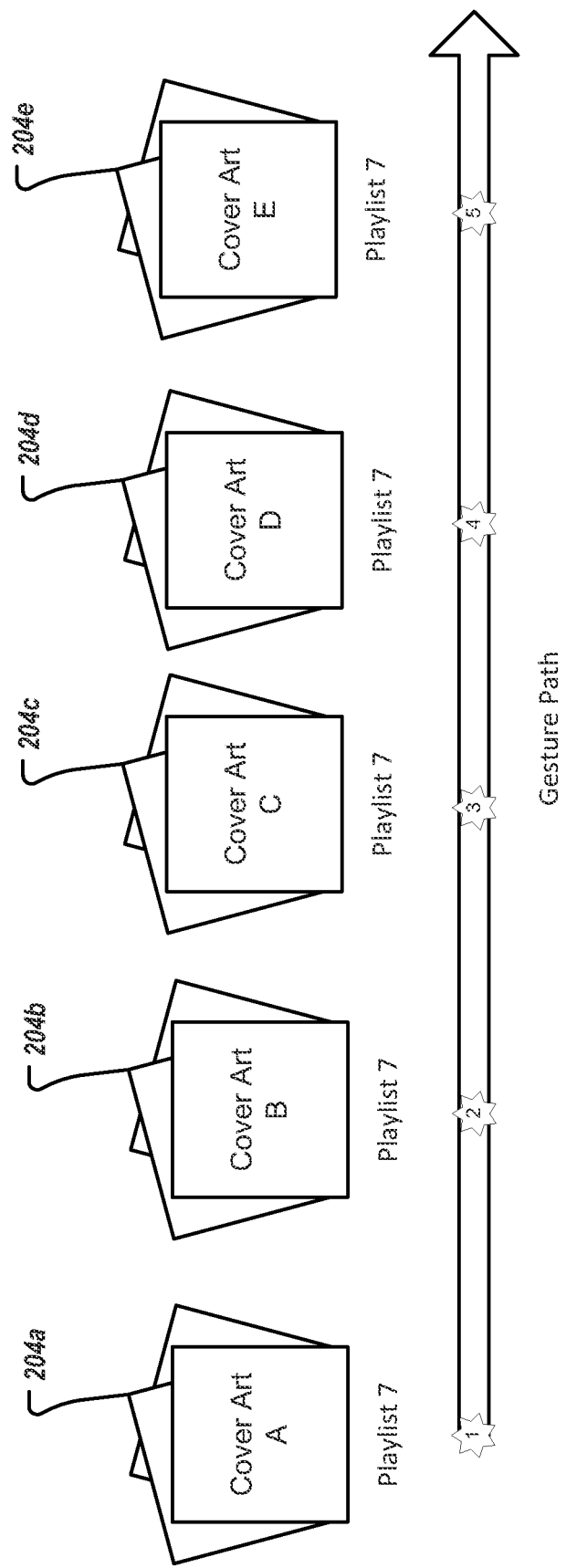
FIG. 2B illustrates scrubbing in stack view.

FIG. 2B illustrates scrubbing in stack view. In some implementations, the user can "scrub" through stack 204 by selecting stack 204 (e.g., using a mouse-over or touch) and then moving the cursor, pointer or finger in the stack view. In the example shown, and assuming a touch sensitive display, the user can select stack 204, and then make repeated swiping gestures on GUI 200 to scrub "in place" through each visual representation in stack 204. As used herein, scrubbing means scrolling in-place through a stack of visual representations where for each swipe gesture or movement of a pointer (e.g., a mouse cursor), the visual representation at the top of the stack is replaced by a next visual representation in stack 204. For example, Playlist 7 can be scrubbed when the user gestures along a horizontal gesture path in GUI 200 represented conceptually by points 1-5 in stack view 204, where each point indicates the position of a finger or stylus in the gesture path where the visual representation changes to the next representation (e.g., from Cover Art A to Cover Art E) in stack 204. The replacing of the top visualization with the next visualization can be animated in a variety of ways to provide a visually pleasing transition for the user.

In some implementations, the scrubbing rate can be proportional to the rate of the gesture or a fixed ratio of the two rates. The scrubbing rate can also be a function of the number of items in the playlist. In such an implementation, the swipe gesture path distance traversed on the display screen will scrub through the entire playlist regardless of the number of media items in the playlist.

Exemplary Processes

Figure 3:
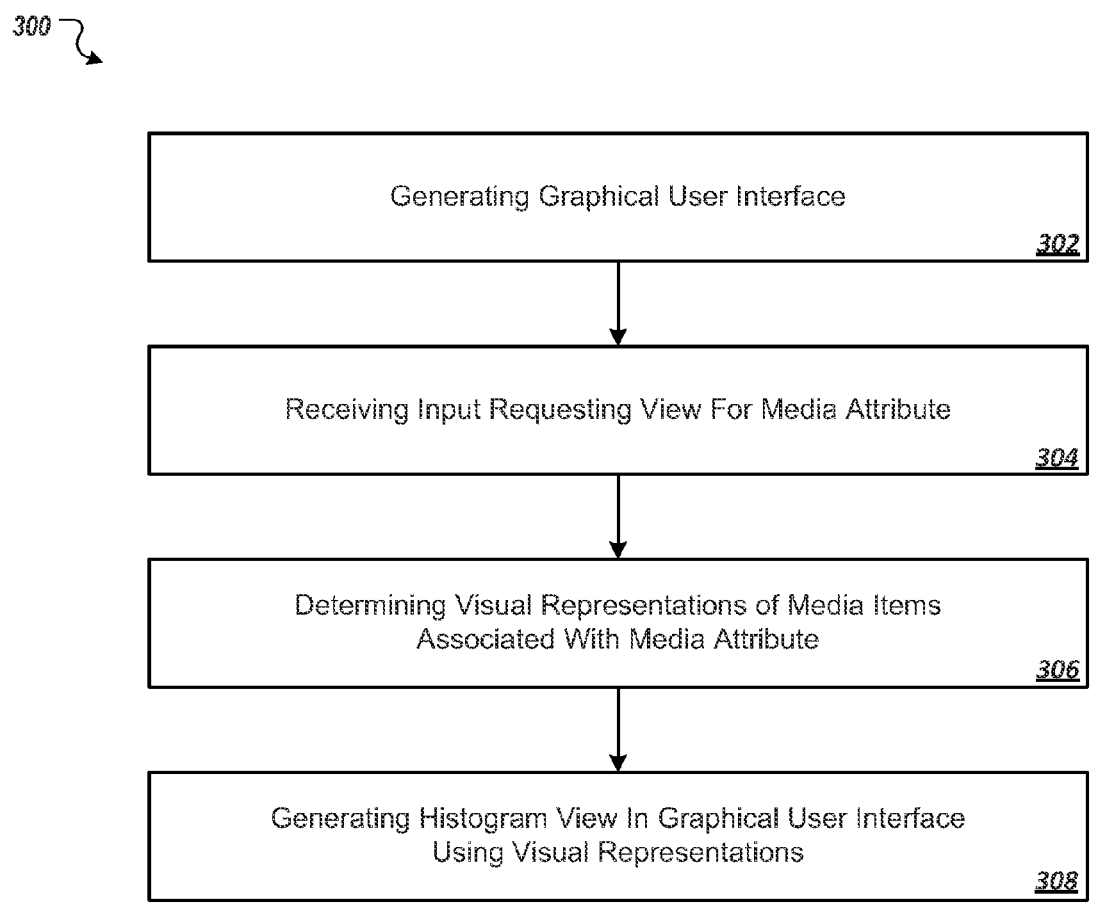
FIG. 3 is a flow diagram of an exemplary process for generating a histogram view of digital media items.

FIG. 3 is a flow diagram of an exemplary process 300 for generating a histogram view of digital media items. In some implementations, process 300 can begin by generating a GUI (302). For example, the GUI can be generated for a digital media application running on a device with a display screen, such as a computer, smart phone, electronic tablet or television system.

Process 300 can continue by receiving input requesting a view for a media attribute (302), such as an artist or composer. The input can be provided by a user selecting a user interface element in the GUI using a mouse cursor, finger or other input device.

Process 300 can continue by determining visual representations for digital media items associated with the media attribute that are available from a media source. The visual representations can be icons representing digital media items. The media source can be a digital media library that resides on the device, or on a network, or on both the device and the network Process 300 can continue by generating a histogram view in the GUI using the visual representations. The histogram view can include regions that are associated with descriptions of media attributes, such as artist or composer names. For example, the regions can be rows of an artist or composer list displayed in the GUI. The visual representations can be displayed in the regions to indicate the number of digital media items associated with a particular media attribute that are available from the media source.

Figure 4:
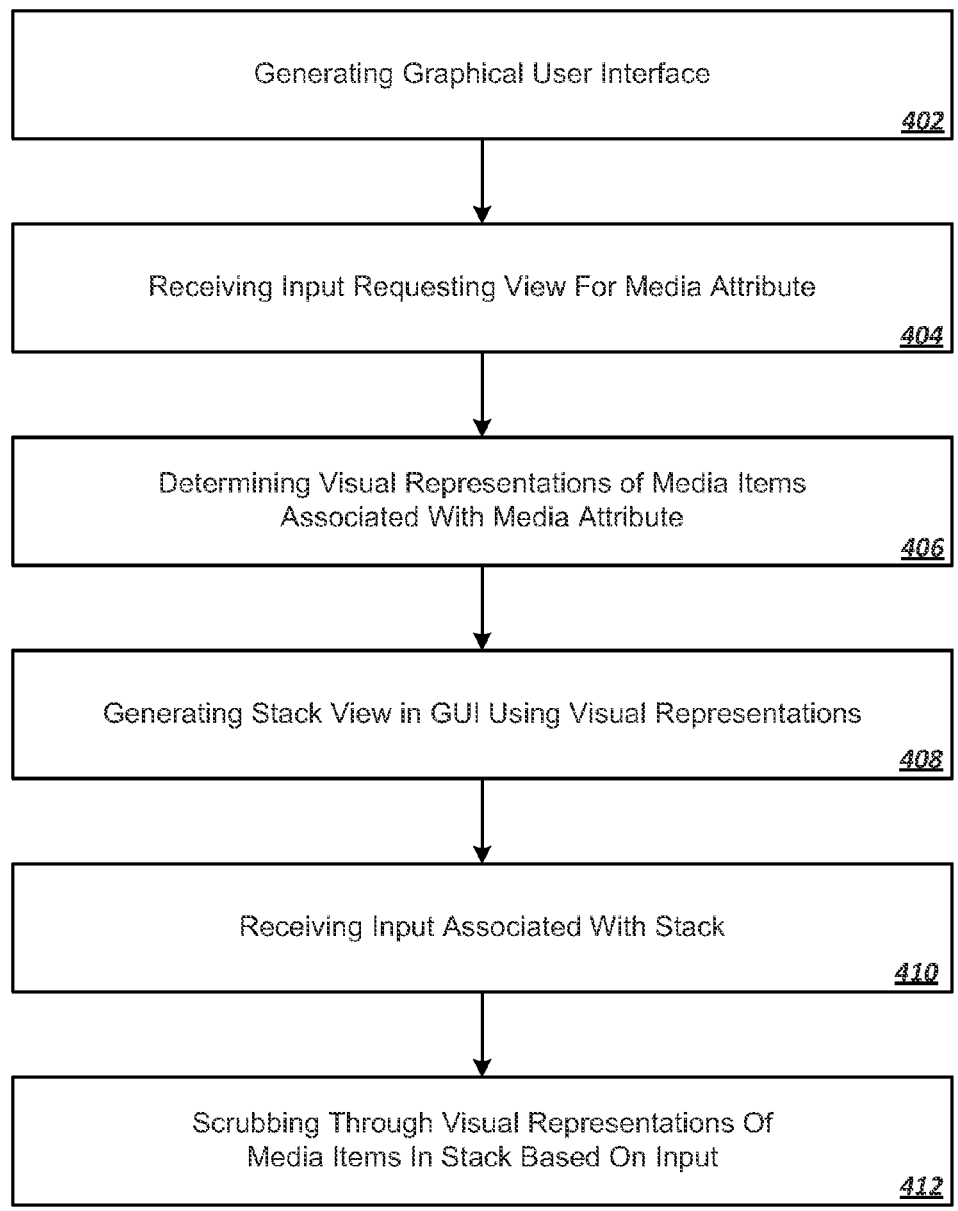
FIG. 4 is a flow diagram of an exemplary process for generating a stack view of digital media item, and scrubbing through the digital media items in the stack.

FIG. 4 is a flow diagram of an exemplary process 400 for generating a stack view of visual representations of digital media items, and scrubbing through the stack. In some implementations, process 400 can begin by generating a GUI (402). For example, the GUI can be generated by a digital media application running on a mobile device with a display screen, such as an electronic tablet.

Process 400 can continue by receiving input requesting a view for a media attribute (404), such as a playlist. The digital media items can be associated with a variety of media attributes, including but not limited to playlists, artists, composers and genres. The input can be provided by a user selecting a user interface element in the GUI using a mouse cursor, finger or other input device.

Process 400 can continue by determining visual representations for digital media items associated with the media attribute. The visual representations can be icons representing digital media items.

Process 400 can continue by generating a stack view of digital media items in the GUI using the visual representations (408). The stack view can include displaying visual representations in a stack arrangement where the visual representations are misaligned to indicate the number of items in the stack and to create the look and feel of a stack of items (e.g., a stack of album covers).

Process 400 can continue by receiving input associated with a stack (410). The input can be a touch gesture by a user along a gesture path in the GUI. The gesture path does not need to intersect with the stack in the GUI. The gesture path does not need to be horizontal and can be in the vertical or other direction in the GUI. The path can also be a gesture, such as a pinching gesture. The input causes scrubbing through the visual representations of media items in the stack (412). The rate of scrubbing can be proportional to the rate of the gesture in the GUI or a fixed ratio of the two rates.

Exemplary Operating Environment

Figure 5:
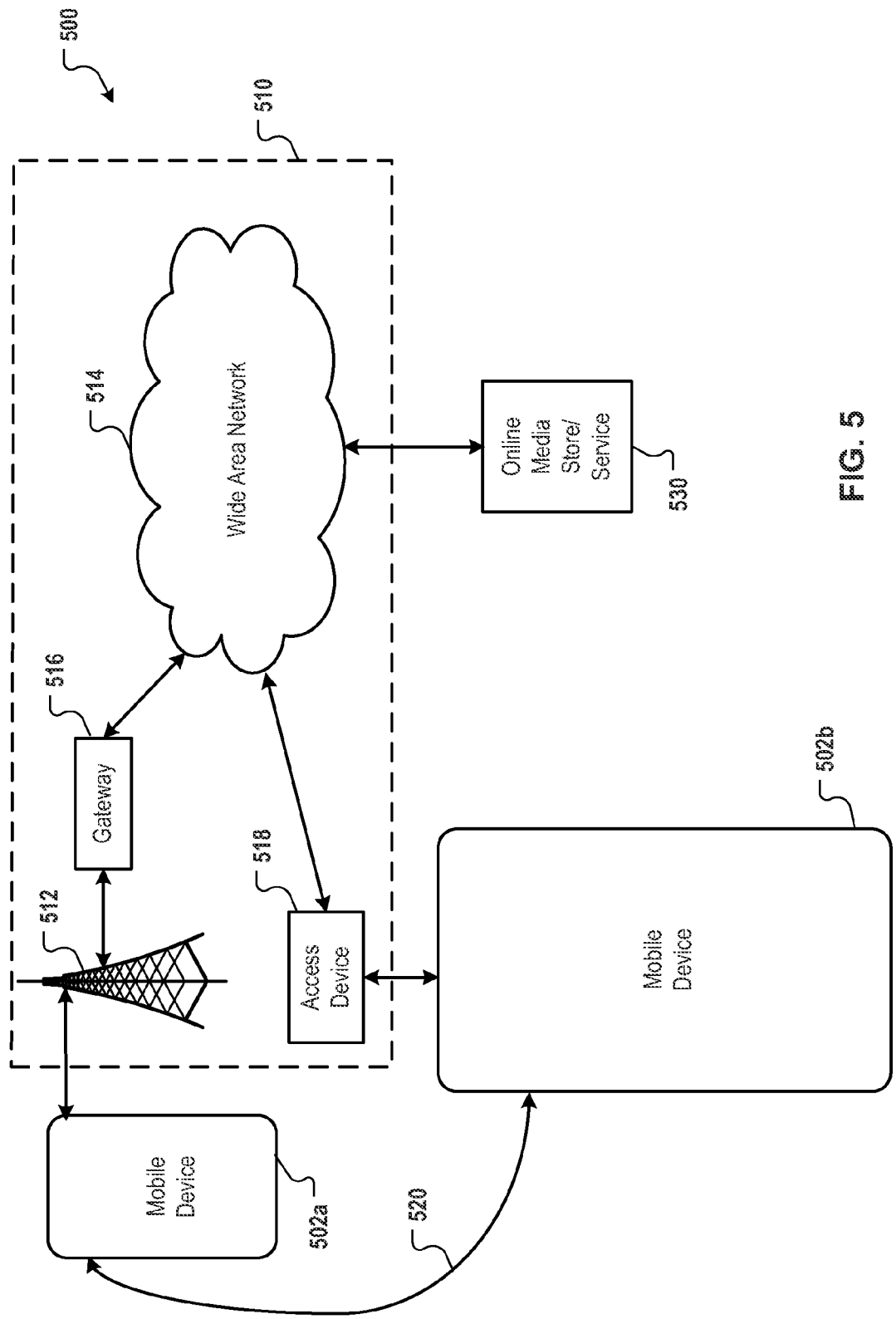
FIG. 5 is a block diagram of an exemplary operating environment for a mobile device capable of viewing digital media items.

FIG. 5 is a block diagram of an exemplary operating environment for a mobile device capable of viewing media content. Mobile devices 502a and 502b can communicate over one or more wired or wireless networks 510. For example, a wireless network 512 (e.g., a cellular network) can communicate with wide area network (WAN) 514, such as the Internet, by use of gateway 516. Likewise, access device 518, such as an 802.11g wireless access device (e.g., a router), can provide communication access to WAN 514.

In some implementations, both voice and data communications can be established over wireless network 512 and access device 518. For example, mobile device 502a can place and receive phone calls (e.g., using voice over Internet Protocol (VoIP)), send and receive e-mail messages (e.g., using Post Office Protocol 3 (POP3)), and retrieve electronic documents or streams, such as Web pages, photographs, and videos, over wireless network 512, gateway 516, and WAN 514 (e.g., using Transmission Control Protocol/Internet Protocol (TCP/IP) or User Datagram Protocol (UDP)). Likewise, in some implementations, mobile device 502b can place and receive phone calls, send and receive e-mail messages, and retrieve electronic documents over access device 518 and WAN 514. In some implementations, mobile device 502a or 502b can be physically connected to access device 518 using one or more cables and access device 518 can be a personal computer. In this configuration, mobile device 502a or 502b can be referred to as a "tethered" device.

Mobile devices 502a and 502b can also establish communications by other means. For example, mobile device 502a can communicate with other wireless devices, e.g., other mobile devices, cell phones, etc., over wireless network 512. Likewise, mobile devices 502a and 502b can establish peer-to-peer communications 520, e.g., a personal area network (PAN), by use of one or more communication technologies, such as Bluetooth™. Other communication protocols and topologies can also be implemented.

Mobile device 502a or 502b can communicate with one or more services over the one or more wired or wireless networks 512. For example, one or more online stores or media services 530 can provide a marketplace for users to purchase and down load media, such as music, videos, audio books, e-books, software applications and the like.

Mobile device 502a or 502b can also access other data and content over the one or more wired and/or wireless networks 512. For example, content publishers, such as news sites, Rally Simple Syndication (RSS) feeds, web sites, blogs, social networking sites, developer networks, etc., can be accessed by mobile device 502a or 502b. Such access can be provided by invocation of a web browsing function or application (e.g., a browser) in response to a user touching, for example, a Web display object on a screen of mobile device 502a or 502b.

Exemplary Device Architecture

Figure 6:
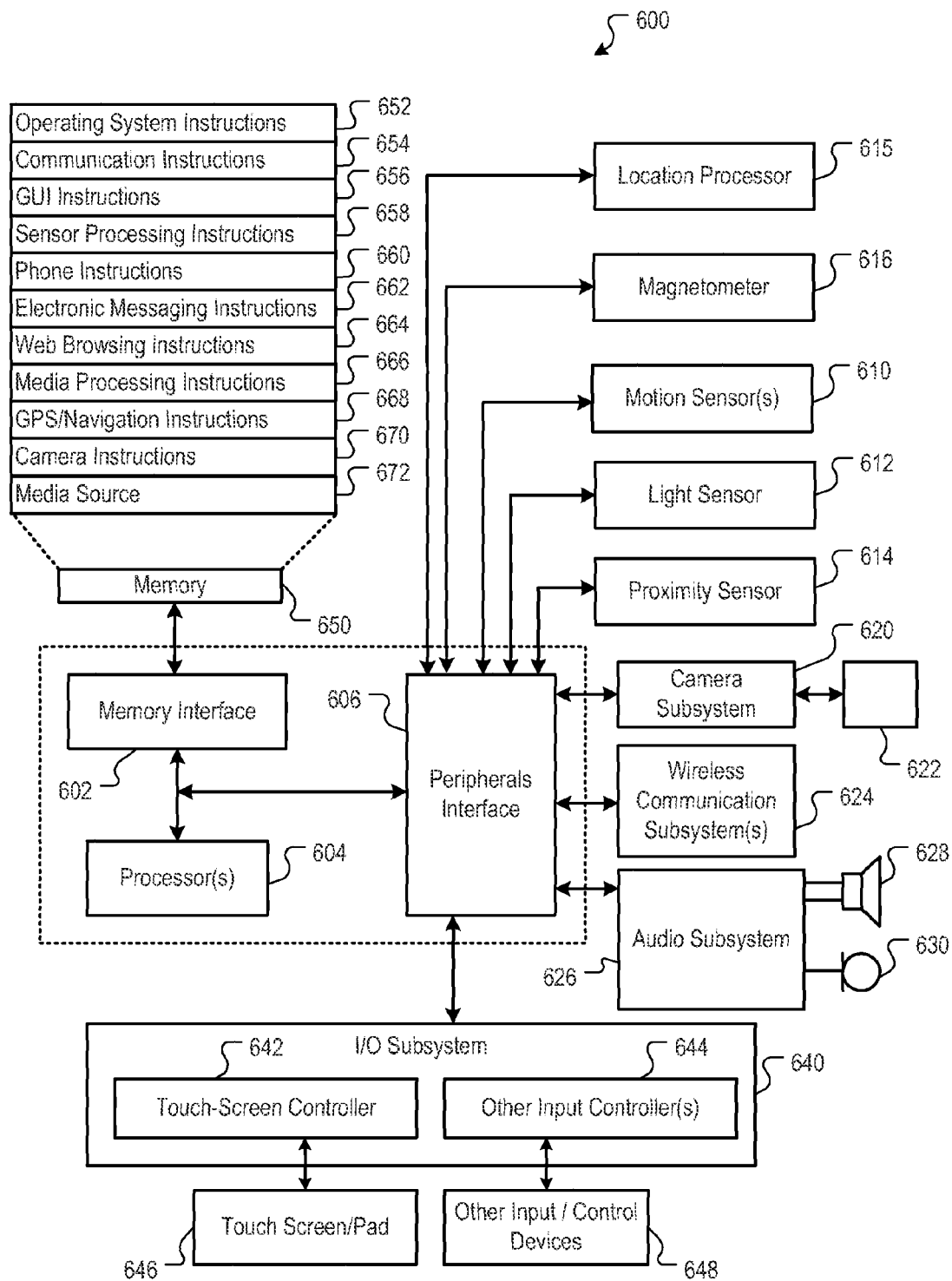
FIG. 6 is a block diagram of an exemplary device architecture that implements the features and processes described with reference to FIGS. 1-5.

FIG. 6 is a block diagram illustrating exemplary device architecture implementing features and operations described in reference to FIGS. 1-5. Device 600 can be any device capable of capturing handwriting on a touch sensitive surface, including but not limited to smart phones and electronic tablets. Device 600 can include memory interface 602, one or more data processors, image processors or central processing units 604, and peripherals interface 606. Memory interface 602, processor(s) 604 or peripherals interface 606 can be separate components or can be integrated in one or more integrated circuits. The various components can be coupled by one or more communication buses or signal lines.

Sensors, devices, and subsystems can be coupled to peripherals interface 606 to facilitate multiple functionalities. For example, motion sensor 610, light sensor 612, and proximity sensor 614 can be coupled to peripherals interface 606 to facilitate orientation, lighting, and proximity functions of the mobile device. For example, in some implementations, light sensor 612 can be utilized to facilitate adjusting the brightness of touch screen 646. In some implementations, motion sensor 610 (e.g., an accelerometer, gyros) can be utilized to detect movement and orientation of the device 600. Accordingly, display objects or media can be presented according to a detected orientation, e.g., portrait or landscape.

Other sensors can also be connected to peripherals interface 606, such as a temperature sensor, a biometric sensor, or other sensing device, to facilitate related functionalities.

Location processor 615 (e.g., GPS receiver) can be connected to peripherals interface 606 to provide geo-positioning. Electronic magnetometer 616 (e.g., an integrated circuit chip) can also be connected to peripherals interface 606 to provide data that can be used to determine the direction of magnetic North. Thus, electronic magnetometer 616 can be used as an electronic compass.

Camera subsystem 620 and an optical sensor 622, e.g., a charged coupled device (CCD) or a complementary metal-oxide semiconductor (CMOS) optical sensor, can be utilized to facilitate camera functions, such as recording photographs and video clips.

Communication functions can be facilitated through one or more communication subsystems 624. Communication subsystem(s) 624 can include one or more wireless communication subsystems. Wireless communication subsystems 624 can include radio frequency receivers and transmitters and/or optical (e.g., infrared) receivers and transmitters. Wired communication system can include a port device, e.g., a Universal Serial Bus (USB) port or some other wired port connection that can be used to establish a wired connection to other computing devices, such as other communication devices, network access devices, a personal computer, a printer, a display screen, or other processing devices capable of receiving or transmitting data. The specific design and implementation of the communication subsystem 624 can depend on the communication network(s) or medium(s) over which device 600 is intended to operate. For example, a mobile device can include communication subsystems 624 designed to operate over a GSM network, a GPRS network, an EDGE network, a WiFi or WiMax network, and a Bluetooth network. In particular, the wireless communication subsystems 624 can include For example, device 600 may include wireless communication subsystems designed to operate over a global system for mobile communications (GSM) network, a GPRS network, an enhanced data GSM environment (EDGE) network, 802.x communication networks (e.g., WiFi, WiMax, or 3G networks), code division multiple access (CDMA) networks, and a Bluetooth™ network. Communication subsystems 624 may include hosting protocols such that the mobile device 600 may be configured as a base station for other wireless devices. As another example, the communication subsystems can allow the device to synchronize with a host device using one or more protocols, such as, for example, the TCP/IP protocol, HTTP protocol, UDP protocol, and any other known protocol.

Audio subsystem 626 can be coupled to a speaker 628 and one or more microphones 630 to facilitate voice-enabled functions, such as voice recognition, voice replication, digital recording, and telephony functions.

I/O subsystem 640 can include touch screen controller 642 and/or other input controller(s) 644. Touch-screen controller 642 can be coupled to a touch screen 646 or pad. Touch screen 646 and touch screen controller 642 can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch screen 646.

Other input controller(s) 644 can be coupled to other input/control devices 648, such as one or more buttons, rocker switches, thumb-wheel, infrared port, USB port, and/or a pointer device such as a stylus. The one or more buttons (not shown) can include an up/down button for volume control of speaker 628 and/or microphone 630.

In one implementation, a pressing of the button for a first duration may disengage a lock of the touch screen 646; and a pressing of the button for a second duration that is longer than the first duration may turn power to mobile device 600 on or off. The user may be able to customize a functionality of one or more of the buttons. The touch screen 646 can also be used to implement virtual or soft buttons and/or a keyboard.

In some implementations, device 600 can present recorded audio and/or video files, such as MP3, AAC, and MPEG files. In some implementations, device 600 can include the functionality of an MP3 player and may include a pin connector for tethering to other devices. Other input/output and control devices can be used.

Memory interface 602 can be coupled to memory 650. Memory 650 can include high-speed random access memory or non-volatile memory, such as one or more magnetic disk storage devices, one or more optical storage devices, or flash memory (e.g., NAND, NOR). Memory 650 can store operating system 652, such as Darwin, RTXC, LINUX, UNIX, OS X, WINDOWS, or an embedded operating system such as VxWorks. Operating system 652 may include instructions for handling basic system services and for performing hardware dependent tasks. In some implementations, operating system 652 can include a kernel (e.g., UNIX kernel).

Memory 650 may also store communication instructions 654 to facilitate communicating with one or more additional devices, one or more computers or one or more servers. Communication instructions 654 can also be used to select an operational mode or communication medium for use by the device, based on a geographic location (obtained by the GPS/Navigation instructions 668) of the device. Memory 650 may include graphical user interface instructions 656 to facilitate graphic user interface processing, including the graphical user interfaces and processes described in reference to FIGS. 1-4; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GPS/Navigation instructions 668 to facilitate GPS and navigation-related processes and instructions; camera instructions 670 to facilitate camera-related processes and functions; and media source 672. The memory 650 may also store other software instructions for facilitating other processes, features and applications.

Each of the above identified instructions and applications can correspond to a set of instructions for performing one or more functions described above. These instructions need not be implemented as separate software programs, procedures, or modules. Memory 650 can include additional instructions or fewer instructions. Furthermore, various functions of the mobile device may be implemented in hardware and/or in software, including in one or more signal processing and/or application specific integrated circuits.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to, communicate with, one or more mass storage devices for storing data files; such devices include magnetic disks, such as internal hard disks and removable disks; magneto-optical disks; and optical disks.

Storage devices suitable for tangibly embodying computer program instructions and data include all forms of non-volatile memory, including by way of semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a player, the features can be implemented on a computer having a display device, such as a CRT (cathode ray tube) or LCD (liquid crystal display) monitor for displaying information to the player. The computer can also have a keyboard and a pointing device such as a game controller, mouse or a trackball by which the player can provide input to the computer.

The features can be implemented in a computer system that includes a back-end component, such as a data server, that includes a middleware component, such as an application server or an Internet server, or that includes a front-end component, such as a client computer having a graphical user interface or an Internet browser, or any combination of them. The components of the system can be connected by any form or medium of digital data communication such as a communication network. Some examples of communication networks include LAN, WAN and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation. The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API. In some implementations, an API call can report to an application the capabilities of a device running the application, such as input capability, output capability, processing capability, power capability, communications capability, etc.

A number of implementations have been described. Nevertheless, it will be understood that various modifications may be made. For example, other steps may be provided, or steps may be eliminated, from the described flows, and other components may be added to, or removed from, the described systems. Accordingly, other implementations are within the scope of the following claims.

What is claimed is:

1. A method comprising:
  receiving, by one or more hardware processors, first input requesting a view of digital media items associated with a digital media source; and
  generating, by the one or more hardware processors, the requested view, the view including a first row associated with a first artist and a second row associated with a second artist, wherein:
    the first row includes a first name of the first artist and a first set of album covers, each album cover in the first set of album covers representing a unique album of the first artist, wherein the first set of album covers in the first row are arranged side-by-side along the first row toward the first name of the first artist and selection of a respective album cover of the album covers in the first row causes playback of music contained in the album corresponding to the respective album cover in the first row;
    the second row includes a second name of the second artist and a second set of album covers, each album cover in the second set of album covers representing a unique album of the second artist, wherein the second set of album covers in the second row are arranged side-by-side along the second row toward the second name of the second artist and selection of a respective album cover of the second set of album covers in the second row causes playback of music contained in the album corresponding to the respective album cover in the second row;
    a visible portion of the first row includes more album covers than a visual portion of the second row;
    the first row has a same height as the second row;
    a distance between an end of the first name and a first album cover in the first row is a first distance;
    a distance between an end of the second name and a first album cover in the second row is a second distance that is different from the first distance; and
    the first distance is limited by a number of album covers in the first row and the second distance is limited by a number of album covers in the second row.

2. The method of claim 1, wherein:
  the first distance is limited by a length of the first name and the second distance is limited by a length of the second name.

3. The method of claim 2, wherein:
  the first name is horizontally aligned with the album covers in the first row, and the second name is horizontally aligned with the album covers in the second row.

4. The method of claim 1, wherein:
  the album covers in the first row are aligned with a first edge of a display region and the first name is aligned with a second edge of the display region that is opposite to the first edge of the display region; and
  the album covers in the second row are aligned with the first edge of the display region and the second name is aligned with the second edge of the display region.

5. The method of claim 1, where the rows are concurrently displayed with album art for an album of a currently playing song.

6. The method of claim 5, where the album art for the currently playing song is larger than album covers in the rows.

7. A system comprising:
one or more processors;
memory configured to store instructions, which, when executed by the one or more processors, causes the one or more processors to perform operations comprising:
receiving first input requesting a view of digital media items associated with a digital media source; and
generating the requested view, the view including a first row associated with a first artist and a second row associated with a second artist, wherein:
the first row includes a first name of the first artist and a first set of album covers, each album cover of the first set of album covers representing a unique album of the first artist, wherein the first set of album covers in the first row are arranged side-by-side along the first row toward the first name of the first artist and selection of a respective album cover of the album covers in the first row causes playback of music contained in the album corresponding to the respective album cover in the first row;
the second row includes a second name of the second artist and a second set of album covers, each album cover of the second set of album covers representing a unique album of the second artist, wherein the one or more album covers in the second row are arranged side-by-side along the second row toward the second name of the second artist and selection of a respective album cover of the one or more album covers in the second row causes playback of music contained in the album corresponding to the respective album cover in the second row;
a visible portion of the first row includes more album covers than a visible portion of the second row;
the first row has a same height as the second row;
a distance between an end of the first name and a first album cover in the first row is a first distance;
a distance between an end of the second name and a first album cover in the second row is a second distance that is different from the first distance; and
the first distance is limited by a length of the first name and the second distance is limited by a length of the second name.

8. The system of claim 7, wherein:
the first distance is limited by a number of album covers in the first row and the second distance is limited by a number of album covers in the second row.

9. The system of claim 7, wherein:
the first name is horizontally aligned with the album covers in the first row and the second name is horizontally aligned with the album covers in the second row.

10. The system of claim 7, wherein:
the album covers in the first row are aligned with a first edge of a display region and the first name is aligned with a second edge of the display region that is opposite to the first edge of the display region; and
the album covers in the second row are aligned with the first edge of the display region and the second name is aligned with the second edge of the display region.

11. The system of claim 7, where the rows are concurrently displayed with album art for an album of a currently playing song.

12. The system of claim 11, where the album art for the currently playing song is larger than album covers in the rows.

13. The method of claim 1, wherein the album covers in the first row are stacked toward the first name of the first artist in the first row, and the album covers in the second row are stacked toward the second name of the second artist in the second row.

14. The system of claim 7, wherein the album covers in the first row are stacked toward the first name of the first artist in the first row, and the album covers in the second row are stacked toward the second name of the second artist in the second row.

15. A non-transitory computer-readable medium storing instructions, which, when executed by one or more processors, causes the one or more processors to perform operations comprising:
receiving first input requesting a view of digital media items associated with a digital media source; and
generating the requested view, the view including a first row associated with a first artist and a second row associated with a second artist, wherein:
the first row includes a first name of the first artist and a first set of album covers, each album cover of the first set of album covers representing a unique album of the first artist, wherein the first set of album covers in the first row are arranged side-by-side along the first row toward the first name of the first artist and selection of a respective album cover of the album covers in the first row causes playback of music contained in the album corresponding to the respective album cover in the first row;
the second row includes a second name of the second artist and a second set of album covers, each album cover of the second set of album covers representing a unique album of the second artist, wherein the one or more album covers in the second row are arranged side-by-side along the second row toward the second name of the second artist and selection of a respective album cover of the one or more album covers in the second row causes playback of music contained in the album corresponding to the respective album cover in the second row;
a visible portion of the first row includes more album covers than a visible portion of the second row;
the first row has a same height as the second row has a plurality of album covers;
a distance between an end of the first name and a first album cover in the first row is a first distance;
a distance between an end of the second name and a first album cover in the second row is a second distance that is different from the first distance;
the first distance is limited by a number of album covers in the first row and a length of the first name; and
the second distance is limited by a number of album covers in the second row and a length of the second name.

16. The non-transitory computer-readable medium of claim 15, wherein:
the album covers in the first row are aligned with a first edge of a display region and the first name is aligned with a second edge of the display region that is opposite to the first edge of the display region; and
the album covers in the second row are aligned with the first edge of the display region and the second name is aligned with the second edge of the display region.

17. The non-transitory computer-readable medium of claim 15, wherein the rows are concurrently displayed with album art for an album of a currently playing song.

18. The non-transitory computer-readable medium of claim 17, wherein the album art for the currently playing song is larger than album covers in the rows.

* * * * *